United States Patent [19]

Bakker

[11] Patent Number: 4,885,342

[45] Date of Patent: Dec. 5, 1989

[54] THERMOPLASTIC POLYMER MIXTURE WITH A HIGH SURFACE GLOSS

[75] Inventor: Reinier G. Bakker, Heerlen, Netherlands

[73] Assignee: Stamicarbon B.V., Geleen, Netherlands

[21] Appl. No.: 247,393

[22] Filed: Sep. 21, 1988

[30] Foreign Application Priority Data

Oct. 13, 1987 [NL] Netherlands .................. 8702438

[51] Int. Cl.$^4$ .............. C08L 35/02; C08L 23/28; C08L 23/16; C08L 23/22
[52] U.S. Cl. .................... 525/230; 525/238; 525/211; 525/234; 525/222; 525/192; 525/233
[58] Field of Search ............ 525/238, 211, 234, 230, 525/222

[56] References Cited

U.S. PATENT DOCUMENTS

| | | | |
|---|---|---|---|
| 4,341,884 | 7/1982 | Schepers | 525/238 |
| 4,341,885 | 7/1982 | Schepers | 525/238 |
| 4,424,309 | 1/1984 | Schepers | 525/238 |
| 4,468,487 | 8/1984 | Schepers et al. | 525/230 |

FOREIGN PATENT DOCUMENTS 0037608 10/1981 European Pat. Off. .

Primary Examiner—Carman J. Seccuro
Attorney, Agent, or Firm—Cushman, Darby & Cushman

[57] ABSTRACT

Thermoplastic polymer mixture with a high surface gloss on the basis of:
a 50–95 wt. % of
  a.1 20–90 wt. % of a copolymer of styrene and/or α-methyl-styrene with acrylonitrile with an acrylonitrile content of 18–27 wt. %, the copolymer having a fluidity of 3–20;
  a.2 5–60 wt. % of a copolymer of styrene and α-methyl-styrene with acrylonitrile with an acrylonitrile content of 25–40 wt. %, the copolymer having a fluidity of at least 25;
  a.3 0–30 wt. % of a polyacrylate compound;
b 5–50 wt. % of
  b.1 a substantially saturated rubber and
  b.2 chlorinated polyethylene.

The thermoplastic polymer mixture not only has a high surface gloss, but also the flow of the mixture has been improved substantially. As a result, the mixture has excellent processing characteristics.

17 Claims, No Drawings

THERMOPLASTIC POLYMER MIXTURE WITH A HIGH SURFACE GLOSS

The invention relates to a thermoplastic polymer mixture on the basis of a vinyl aromatic compound and an unsaturated nitrile, a largely saturated rubber and a chlorinated polyethylene.

Such a polymer mixture is known from European patent specification 0037608. This patent specification describes a polymer mixture on the basis of a copolymer of styrene and acrylonitrile (SAN), an ethylene-propylene-diene rubber (EPDM) and a chlorinated polyethylene (CPE). The mixture has good properties with respect to the impact strength.

For a number of applications it is desirable for objects prepared from such a mixture to have an attractive->glossy surface.

A drawback of the polymer mixture as described in EP-B-0037608 is that objects made from it exhibit insufficient gloss.

The object of the invention is to provide a polymer mixture such that the objects obtained possess an attractive, glossy surface.

The polymer mixture according to the invention is characterized in that it comprises:

a 50–95 wt.% of
  a.1 20–90 wt.% of a copolymer of styrene and/or α-methyl-styrene with acrylonitrile and/or methacrylonitrile, the acrylo-nitrile content being 18–27 wt.% and the copolymer having a fluidity of 3–20;
  a.2 5–60 wt.% of a copolymer of styrene and/or α-methyl-styrene with acrylonitrile, the acrylonitrile content being 25–40 wt.% and the copolymer having a fluidity of at least 25;
  a.3 0–30 wt.% of a polyacrylate compound;
b 5–50 wt.% of
  b.1 a substantially saturated rubber and
  b.2 a chlorinated polyethylene.

It has, surprisingly, been found that moulding compounds prepared from the polymer mixture according to the invention do not only posses a high surface gloss, but the high impact strength and good heat deflection temperature (Vicat, HDT) are retained, while the flow of the mixture has been improved substantially.

By preference the polymer mixture according to the invention comprises:

a.1 20–70 wt.% of a copolymer of styrene and/or α-methyl-styrene and acrylonitrile, the acrylonitrile content being between 18 and 27 wt.% and the fluidity between 3 and 20;
a.2 5–50 wt.% of a copolymer of styrene and/or α-methyl-styrene and acrylonitrile, the acrylonitrile content being 25–40 wt.% and the fluidity at least 25;
a.3 0–30 wt.% of a polyacrylate compound;
b.1 2.5–25 wt.% of a substantially saturated rubber
b.2 2.5–25 wt.% chlorinated polyethylene.

Essential in the polymer mixture according to the invention is the use of two SAN copolymers, wherein one consists of a relative low acrylonitril content (18–17 wt.%), whereas the other consists of a relative high acrylonitril content (25–40 wt.%).

It has been found that the surface gloss is insufficient if the polymer mixture contains only one SAN copolymer with a relatively low acrylonitrile content (18–27 wt.%); if the polymer mixture contains only one SAN copolymer with a high acrylonitrile content (25–40 wt.%), then the surface gloss is sufficient, but the impact strength of the polymer mixture is not.

An important difference between the two SAN copolymers is the fluidity. The fluidity is understood to mean the amount of polymer flowing out of a capillary having a diameter of 1 mm and a length of 10 mm at a temperature of 220° C. and a pressure of 330 N/mm2, expressed in (10−9 m3/s) (see also British patent specification 1.500.525).

It is has been found that the SAN copolymer with a low acrylonitrile content (component a.1) is to have a fluidity of 3–20, while the fluidity of the SAN copolymer with a high acrylonitrile content (component a.2) is to be at least 25. By preference, values of 5–18 and 25–110, respectively, are used.

Both the SAN copolymers can be synthesized by the action of free radicals using the polymerization processes, continuous or batchwise, known for styrene, for instance emulsion, bulk and solution polymerization or combinations thereof. By properly choosing the amount of monomers to be added, a SAN copolymer with the desired acrylonitrile content can be obtained. To achieve the desired fluidity, in suspension and/or emulsion polymerization, for instance, it is sufficient to adjust the chain transfer agent consumption pattern, among other things by variation of the stirring pattern, or, respectively, to adjust the stirring speed. A higher stirring speed results in higher fluidity. The fluidity can also be influenced by reducing the pH to a value below 11, or by reducing the chain transfer agent concentration at the start of the polymerization, as well as by maintaining an adjusted temperature profile.

Apart from these options for achieving the desired fluidity, also the way in which the monomers are added can be adjusted. It is also possible to add extra initiator after the start of the polymerization, or to add the chain transfer agent only after polymerization has proceeded for some time.

By preference the fluidity of component (a.1) is 7–15, and that of component (a.2) 45–60. It is preferred for polymerization to take place by means of emulsion polymerization, with addition of the customary auxiliary materials such as emulsifiers, caustic soda, salts, soaps, free radical donors and chain transfer agents.

Examples of copolymers that can be used in the polymer mixture according to the invention are styrene-acrylonitrile copolymer, α-methyl-styrene=acrylonitrile copolymer, styrene or α-methyl-styreneacrylonitrile terpolymer, as well as copolymers of acrylonitrile with halogenated styrene or mixtures of two or more of the aforementioned polymers. If desired, the acrylonitrile may wholly or partly be replaced with methacrylonitrile. By preference the acrylonitrile content of component (a.1) is 20–24 wt.%, and that of component (a.2) 30–40 wt.%, more in particular 30–35 wt.%.

The polymer mixture according to the invention contains 0–30 parts by weight of a polyacrylate compound. By preference the polyacrylate compound is polymethylmethacrylate (PMMA). Addition of more than 30 wt.% PMMA results in poor properties with respect to the impact strength and the heat resistance. By preference the polymer mixture according to the invention contains 0–10 wt.% PMMA.

Suitable rubber-like, substantially saturated polymers are rubbers possessing no or little unsaturations in the main chain, that is, possessing less than 2, and preferably less than 1.5 double bonds per 100 carbon atoms. The rubbers may possess unsaturation in the branch chains, and this may be utilized for, for instance, crosslinking.

Rubbers that are highly suitable for use in the polymer mixture according to the invention are ethylene-propylene copolymers (the so-called EP rubbers) and ethylene-propylene copolymers in which other polyunsaturated monomers have been copolymerized (the so-called EPDM rubbers), as well as butyl rubber (a polymer on the basis of isobutene), chloro-butyl rubber, acrylate rubber and ethylene vinyl acetate copolymers with a high vinyl acetate content, or mixtures of two or more of these rubbers. Examples of polyunsaturated monomers include hexadiene-1,4, dicyclopentadiene, tricyclopentadiene, 5-vinyl norbornene-2, 5-methylene norbornene-2, 5-ethylidene-norbornene-2,5(2-propenyl)norbornene-2, 5-(5-hexenyl)-norbornene-2, 4,7,8,9-tetrahydroindene and isopropylidene tetrahydroindene.

As it is not essential for the polymer composition to be cured, use of polyunsaturated monomers is not necessary. For economic considerations it may therefore be advantageous to use EP-rubber in the polymer composition.

In certain cases it may be advantageous to partly or wholly crosslink the rubber. This can be done in the customary manner, for instance by means of peroxides or by using chemically modified rubber.

The chlorinated polyethylene or a mixture of two or more chlorinated polyethylenes that is suitable for application in the polymer compositions according to the invention can be synthesized in a known manner by chlorinating polyethylene in solution, suspension or gas phase. Reference is made to, for instance, Dutch patent applications laid open to public inspection Nos. 7311780 and 7701599. By preference the starting material is high-density polyethylene, that is, polyethylene with a density between 935 and 965 kg/m$^3$, which may have been made using a catalyst on the basis of transition metals.

The weight ratio between the chlorinated polyethylene and the rubber preferably is within 1:20 and 20:1. Within these limits a polymer composition is obtained that has an exceptionally good impact strength, also at a low temperature ($-20°$ C.).

Optimum properties are achieved if the weight ratio between chlorinated polyethylene and largely saturated rubber is between 1:4 and 4:1.

According to a preferred embodiment of the invention use is made of a chlorinated polyethylene having a chlorine content of 30–40 wt.% and a DSC crystallinity of 0–40%, while the weight ratio of rubber to chlorinated polyethylene in the polymer composition is between 2:1 and 1:10. By preference the DSC crystallinity is 0–7%.

The DSC crystallinity is determined by first keeping a sample for five minutes at 150° C., in a differential scanning calorimeter, subsequently cooling to 50° C. at a cooling rate of 5°C. per minute, and reheating to 150° C., at a rate of 5° C. per minute. During said heating procedure the melting heat is measured. The crystallinity is determined by means of the following formula:

$$\text{Crystallinity (\%)} = \frac{\text{melting heat measured (J/g)}}{\text{theoretical melting heat of 100\% crystalline polyethylene (J/g)}} \times 100° \text{ C.}$$

The glass transition temperature of the chlorinated polyethylene may be ($-25°$ C.) or higher, the upper limit not being critical. In practice, the upper limit of the glass transition temperature for chlorinated polyethylene will be determined by the demands as regards crystallinity and chlorine content. This limit is about $+10°$ C.

Glass transition temperature is here understood to mean the temperature at which the maximum obtained in damping (G", loss modulus), measured with a torsion damping meter at a frequency of 0.2153 Hz and a heating rate of 1° C. per minute, is characteristic of the type of chlorinated polyethylene.

In this context it is noted that chlorinated polyethylene usually has two transition temperatures. One transition generally lies around $-120°$ C. The other transition temperature lies at a higher value and varies with the way the chlorinated polyethylene has been prepared. The latter transition temperature is usually referred to in literature as the glass transition temperature of chlorinated polyethylene. It is, therefore, this latter temperature which is here denoted as glass transition temperature of chlorinated polyethylene.

The polymer composition according to the invention can be prepared in a known way, using the customary methods, from the various basic materials. Depending on the form in which the basic materials are available (powder, crumb, liquid). several items of equipment of combinations thereof can be used, such as an impeller mixer, Banbury mixer, kneader mixer, etc.

Since impact resistant polymer compositions are mainly supplied in the form of granulate by producers, the polymer composition will generally, after mixing of the basic materials, be pelletized by means of an extruder. Mixing may also take place in this extruder.

The customary additives may be added to the polymer composition, such as dyestuffs, pigments, UV stabilizers, fungicides, etc.

The polymer composition according to the invention is particularly suitable for the manufacture of articles that are to meet high demands as regards the mechanical and physical properties, such as impact strength, rigidity, etc., which properties should be combined with high surface gloss.

The polymer composition according to the invention is suitable for many applications. Thus, for instance, it can be used for the manufacture of impact resistant articles, such as tubing, bottles, furniture, helmets, housings and casings for electronic and domestic appliances, shoe heels, caravans, skis and surfboards.

The invention will be elucidated on the basis of the following examples, without being restricted thereto.

EXAMPLES 1 THROUGH 9 AND COMPARATIVE EXAMPLES I THROUGH V

Use was made of the types of SAN copolymers indicated in Table 1.

TABLE 1

| SAN type | fluidity dg/min | ACN° wt. % |
|---|---|---|
| 1. Luran ® 368 R | 10 | 24 |
| 2. Luran ® R2 035 | 50 | 33 |
| 3. JSR ® AS 2F | 101 | 32 |
| 4. JSR ® AS 230 | 25 | 26 |
| 5. JSR ® 240 | 9 | 29 |

°ACN = acrylonitril; Luran is a trade name of a SAN-copolymer of BASF; JSR = Japan Synthetic Rubber Company As rubber, an EPT rubber with an ethylene content of 74 wt.%, an ethylidene-norbornene content of 1.85 wt.% and a Hoekstra plasticity of 53 was used in the synthesized polymer mixture.

The chlorinated polyethylene has a chlorine content of 35 wt.%, a crystallinity below 1% and a glass transition temperature of $-20°$ C.

The amounts used are given in Table 2.

TABLE 2

| Example | SAN type wt. % | | | | | CPE wt. % | EPDM wt. % |
|---|---|---|---|---|---|---|---|
| | 1 | 2 | 3 | 4 | 5 | | |
| I | 70.5 | — | — | — | — | 17.7 | 11.8 |
| 1 | 60.5 | 10 | — | — | — | 17.7 | 11.8 |
| 2 | 50.5 | 20 | — | — | — | 17.7 | 11.8 |
| 3 | 40.5 | 30 | — | — | — | 17.7 | 11.8 |
| 4 | 60.5 | — | 10 | — | — | 17.7 | 11.8 |
| 5 | 50.5 | — | 20 | — | — | 17.7 | 11.8 |
| 6 | 40.5 | — | 30 | — | — | 17.7 | 11.8 |
| 7 | 60.5 | — | — | 10 | — | 17.7 | 11.8 |
| 8 | 50.5 | — | — | 20 | — | 17.7 | 11.8 |
| 9 | 40.5 | — | — | 30 | — | 17.7 | 11.8 |
| II | 60.6 | — | — | — | 10 | 17.7 | 11.8 |
| III | 50.5 | — | — | — | 20 | 17.7 | 11.8 |
| IV | 40.5 | — | — | — | 30 | 17.7 | 11.8 |
| V | — | — | — | — | 70.5 | 17.7 | 11.8 |

The mixtures were prepared on a Farrel$^R$ batch kneader under the following conditions:
-kneading chamber temperature 120° C.;
-speed 120/100;
-ram pressure 3 bar;
-kneading time 5 minutes,
following which the mixture was washed, dried and pelletized.

The granulates obtained were processed into film gate mouldings on an Arburg-1 injection machine. The mouldings obtained were characterized for their impact strength (23° C., according to ISO heat deflection temperature (HDT, unannealed, according to ASTM D 648 (at 1.8 MPa)), gloss (0/00) and flow (MFI, dg/min). The results obtained are presented in Table 3.

TABLE 3

| Example | IZOD KJ/m$^2$ | HDT C | gloss 0/00 | MFI dg/min |
|---|---|---|---|---|
| 1 | 53.2 | 81 | 57.7 | 10.8 |
| 2 | 48.8 | 81 | 58.2 | 15.3 |
| 3 | 46.1 | 81 | 59.4 | 20.4 |
| 4 | 48.7 | 78 | 57.9 | 11.2 |
| 5 | 45.6 | 80 | 58.9 | 17.8 |
| 6 | 43.8 | 79 | 60.0 | 25.2 |
| 7 | 53.2 | 80 | 56.8 | 10.1 |
| 8 | 51.3 | 79 | 57.2 | 12.0 |
| 9 | 50.8 | 80 | 59.2 | 14.6 |
| I | 53.2 | 81 | 53.1 | 9.8 |
| II | 52.7 | 80 | 53.2 | 9.9 |
| III | 50.5 | 81 | 53.1 | 10.5 |
| IV | 47.9 | 82 | 53.2 | 10.7 |
| V | 20 | 79 | 52.1 | 9.2 |

Examples I, II, III, IV and V are comparative examples.

Comparative example I illustrates that with one SAN copolymer the polymer mixture does have good properties with respect to IZOD and HDT, but the gloss is insufficient.

Comparative examples II, III and IV show that when the combinations of SAN copolymers used are not right, not only the gloss but also the fluidity is insufficient.

I claim:

1. Thermoplastic polymer mixture with a high surface gloss on the basis of a copolymer of a vinyl aromatic compound and an unsaturated nitrile, a largely saturated rubber and a chlorinated polyethylene, characterized in that the polymer mixture comprises:
a 50-95 wt.% of
a.1 20-90 wt.% of a copolymer of styrene and/or α-methyl-styrene with acrylonitrile with an acrylonitrile content of 18-27 wt.%, the copolymer having a fluidity of 3-20;
a.2 5-60 wt.% of a copolymer of styrene and α-methyl-styrene with acrylonitrile with an acrylonitrile content of 25-40 wt.%, the copolymer having a fluidity of at least 25;
a.3 0-30 wt.% of a polyacrylate compound;
b 5-50 wt.% of
b.1 a substantially saturated rubber and
b.2 a chlorinated polyethylene.

2. Polymer mixture according to claim 1, characterized in that the mixture consists of:
a.1 20-70 wt.% of a copolymer of styrene and/or α-methyl-styrene and acrylonitrile with an acrylonitrile content of 18-27 wt.% and a fluidity of 3-20;
a.2 5-50 wt.% of a copolymer of styrene and acrylonitrile with an acrylonitrile content of 25-40 wt.% and a fluidity of at least 25;
a.3 0-30 wt.% of a polyacrylate compound;
b.1 2.5-25 wt.% of a substantially saturated rubber
b.2 2.5-25 wt.% of chlorinated polyethylene.

3. Polymer mixture according to claim 1 characterized in that component a.1. has a fluidity of 5-18 and component a.2. a fluidity of 25-110.

4. Polymer mixture according to claim 1 characterized in that component a.1. has a fluidity of 7-15 and component a.2. a fluidity of 45-60.

5. Polymer mixture according to claim 1 characterized in that the acrylonitrile content of component a.2. is between 30 and 35 wt.%.

6. Polymer mixture according to claim 1 characterized in that the polyacrylate compound is polymethylmethacrylate.

7. Polymer mixture according to claim 1 characterized in that the rubber is an ethylene-propylene rubber and/or an ethylene-propylene-diene rubber.

8. Article with high surface gloss, composed wholly or partly of a polymer mixture according to claim 1.

9. Polymer mixture according to claim 2, characterized in that component a.1. has a fluidity of 5-18 and component a.2. a fluidity of 25-110.

10. Polymer mixture according to claim 3, characterized in that component a.1. has a fluidity of 7-5 and component a.2. a fluidity of 45-60.

11. Polymer mixture according to claim 9, characterized in that component a.1. has a fluidity of 7-15 and component a.2. a fluidity of 45-60.

12. Polymer mixture according to claim 2, characterized in that the acrylonitrile content of component a.2. is between 30 and 35 wt.%.

13. Polymer mixture according to claim 3, characterized in that the acrylonitrile content of component a.2. is between 30 and 35 wt %.

14. Polymer mixture according to claim 2, characterized in that the polyacrylate compound is polymethyl methacrylate.

15. Polymer mixture according to claim 3, characterized in that the polyacrylate compound is polymethyl methacrylate.

16. Polymer mixture according to claim 2, characterized in that the rubber is an ethylene-propylene rubber and/or an ethylene-propylene-diene rubber.

17. Polymer mixture according to claim 6, characterized in that the rubber is an ethylene-propylene rubber and/or an ethylene-propylene-diene rubber.

* * * * *